United States Patent [19]

Kozakae et al.

[11] Patent Number: 4,916,974
[45] Date of Patent: Apr. 17, 1990

[54] STEPLESS SPEED CHANGE DEVICE

[75] Inventors: Kunitoshi Kozakae; Tohru Takeda, both of Ageo, Japan

[73] Assignee: Bridgestone Cycle Co., Ltd., Japan

[21] Appl. No.: 155,489

[22] Filed: Feb. 12, 1988

[30] Foreign Application Priority Data

| Feb. 21, 1987 | [JP] | Japan | 62-38817 |
| Feb. 21, 1987 | [JP] | Japan | 62-38818 |
| Jan. 6, 1988 | [JP] | Japan | 63-426 |
| Jan. 6, 1988 | [JP] | Japan | 63-427 |

[51] Int. Cl.$^4$ ............................................. F16H 3/44
[52] U.S. Cl. .................................... 475/166; 74/211; 74/594.2; 192/64; 475/170
[58] Field of Search .................. 74/796, 793, 750 B, 74/190, 211, 594.2; 192/64, 45.2, 45.1

[56] References Cited

U.S. PATENT DOCUMENTS

| 531,577 | 12/1984 | Teal | 192/45.1 |
| 1,610,794 | 2/1925 | Keller, Sr. | 192/41 R |
| 2,024,486 | 5/1934 | Thompson | 192/45.1 |
| 3,302,761 | 2/1967 | Zlotek | 192/45.2 |
| 3,874,253 | 4/1975 | Waddington | 74/750 B X |
| 4,181,043 | 1/1980 | Waddington | 74/750 B |
| 4,277,986 | 7/1981 | Waddington | 74/750 B |
| 4,363,390 | 12/1982 | Eisend et al. | 192/64 X |
| 4,697,469 | 10/1987 | Takamiya et al. | 74/63 X |
| 4,712,450 | 12/1987 | Takamiya et al. | 74/63 X |
| 4,732,054 | 3/1988 | Takamiya et al. | 74/750 B |
| 4,838,122 | 6/1989 | Takamiya et al. | 192/64 X |
| 4,838,401 | 6/1989 | Nagano | 192/64 |
| 4,854,191 | 8/1989 | Nagano | 74/750 B |

FOREIGN PATENT DOCUMENTS

| 860437 | 1/1941 | France | 192/45.2 |
| 1334006 | 7/1962 | France | 192/64 |
| 61-218491 | 9/1986 | Japan | 74/750 B |
| 15096 | 7/1897 | Switzerland | 192/64 |
| 362923 | 12/1931 | United Kingdom | 192/45.1 |

Primary Examiner—Dwight G. Diehl
Assistant Examiner—Chris Campbell
Attorney, Agent, or Firm—Arnold, White & Durkee

[57] ABSTRACT

A stepless speed change device including an eccentric cam assembly whose eccentricity is adjustable relative to a center shaft, a carrier rotatably arranged about the eccentric cam assembly, rotary members on input and output sides, respectively, and a plurality of friction pieces arranged in two rows each including a plurality of the friction pieces. The friction pieces in one row are rockably connected to the rotary member on the input side and free ends of the friction pieces are engaged with an inside of the carrier. The friction pieces in the other row are rockably connected to the carrier and free ends of the friction pieces are engaged with an inside of the rotary member on the output side. As an alternative, all the friction pieces are rockably connected to the carrier and free ends of the friction pieces in one row and the other row are engaged with insides of the rotary members on the input and output sides, respectively.

4 Claims, 20 Drawing Sheets

FIG_1

FIG_2

FIG_3

FIG_4

FIG_5

FIG_6

FIG_7

FIG_8

FIG_9

FIG_10

FIG_11

FIG_14

FIG_15

FIG_16

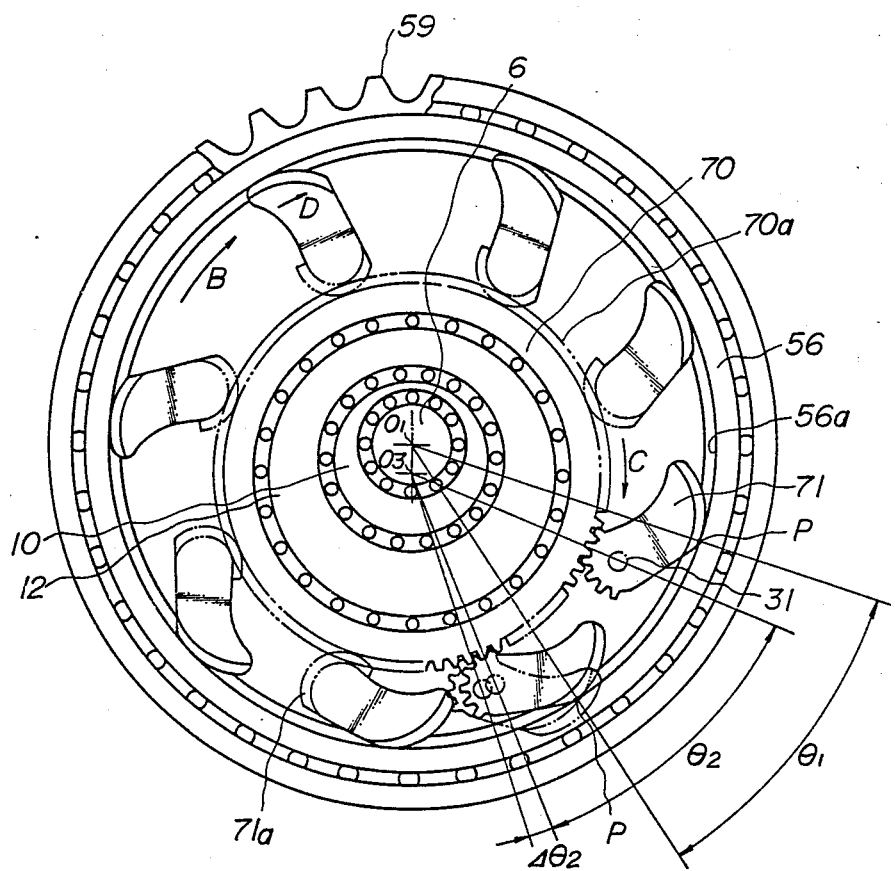
FIG_19

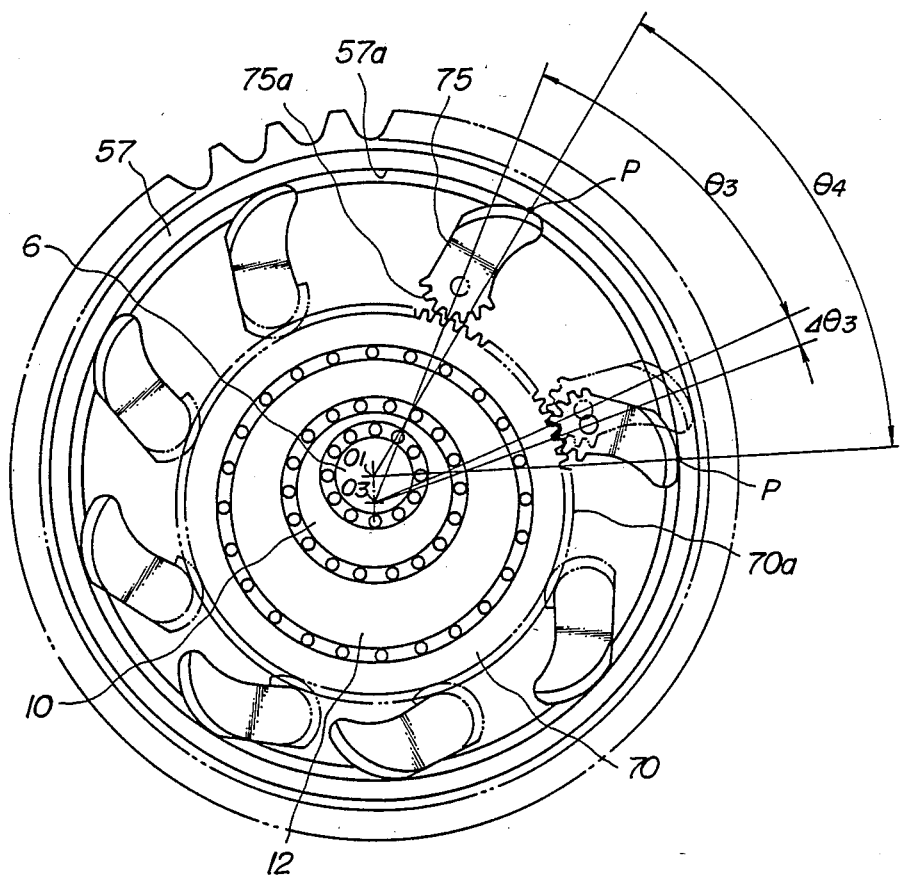
FIG_20

STEPLESS SPEED CHANGE DEVICE

BACKGROUND OF THE INVENTION

This invention relates to a stepless speed change device capable of changing its transmission speed in a stepless manner by frictionally engaging wedge-shaped friction pieces with V-shaped grooves and particularly suitable for a bicycle.

Such a stepless speed change device has been known as disclosed in Japanese Patent Application Laid-open No. 61-218,491 filed by applicant of this case. However, this stepless speed change device of the prior art is so constructed as to be applied to a rear wheel hub of a bicycle. Accordingly, it could not be applied onto a crankshaft of a bicycle.

SUMMARY OF THE INVENTION

It is a principal object of the invention to provide a stepless speed change device which is adapted to be applied to a crankshaft of a bicycle and is simple in construction and compactly formed in a thin shape.

In order to achieve this object, a stepless speed change device according to the invention comprises an eccentric cam assembly whose eccentricity is adjustable relative to a center shaft, a carrier rotatably arranged about said eccentric cam assembly, rotary members on input and output sides, respectively, and a plurality of friction pieces arranged in two rows, each row including a plurality of the friction pieces, said friction pieces in one row being connected rockably to said rotary member on the input side thereto and free ends of the friction pieces being engaged with an inside of said carrier, and said friction pieces in the other row being connected to said carrier rockably thereto and free ends of the friction pieces being engaged with an inside of said rotary member on the output side.

The device constructed as above described according to the invention is provided on a crankshaft of a bicycle to connect a rotary member on an input side to the crankshaft, and a sprocket is integrally provided on a rotary member on an output side so as to engage a chain, thereby obtaining a stepless speed change device on a side of the crankshaft, which is simple in construction and compact in a thin configuration.

According to this invention, the bottom ends of the friction pieces are formed with the sector gears adapted to engage the gears provided on the carrier. Therefore, the rocking zone of the friction pieces is increased with changing speeds in comparison with that of friction pieces whose bottoms are pivoted, thereby increasing the speed-up ratio.

In a second aspect of the invention, a stepless speed change device comprises an eccentric cam assembly whose eccentricity is adjustable relative to a center shaft, a carrier rotatably arranged about said eccentric cam assembly, rotary members on input and output sides, respectively, and a plurality of friction pieces arranged in two rows, each row including a plurality of the friction pieces, all said friction pieces being connected to said carrier rockably thereto and free ends of the friction pieces in one row and the other row being engaged with insides of said rotary members on the input and output sides, respectively.

According to this invention, the bottoms of a plurality of rows of the friction pieces are pivotally connected to the carrier, the carrier is not constructed in a cantilever and the pivotal pins are commonly used for the friction pieces. Therefore, the stepless speed change device according to the invention is simple in construction and easy to manufacture and assemble and achieves improved strength, light weight and compact construction.

The invention will be more fully understood by referring to the following detailed specification and claims taken in connection with the appended drawings.

BRIEF DESCRIPTION OF THE DRAWINGS

FIGS. 19 and 20 are views for explaining the operation of the device with the maximum eccentricity in FIG. 18.

DESCRIPTION OF THE PREFERRED EMBODIMENTS

Figure 1:
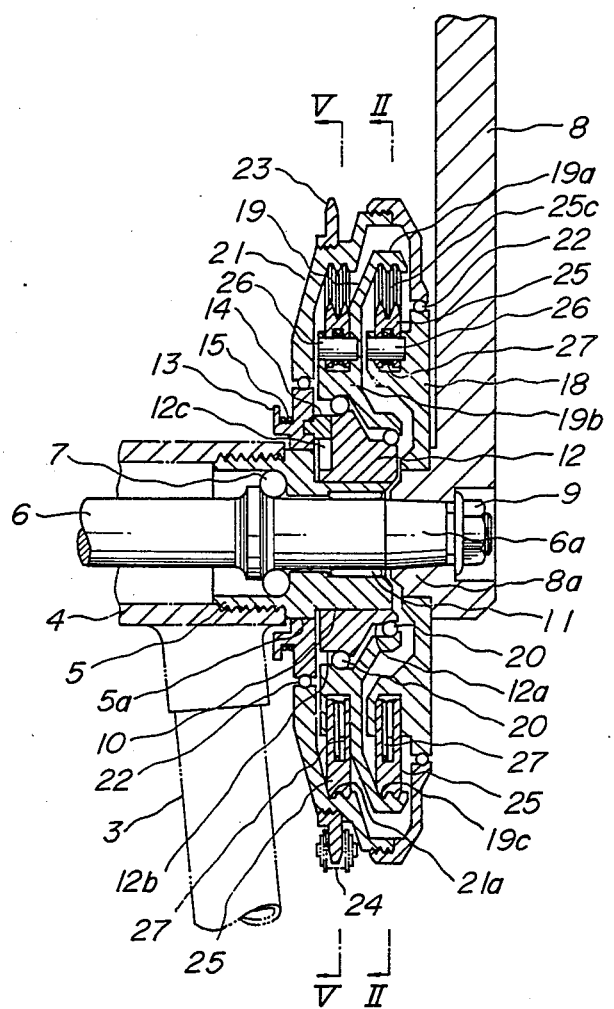
FIG. 1 is a sectional view of one embodiment of the stepless speed change device according to the invention.
Figure 2:
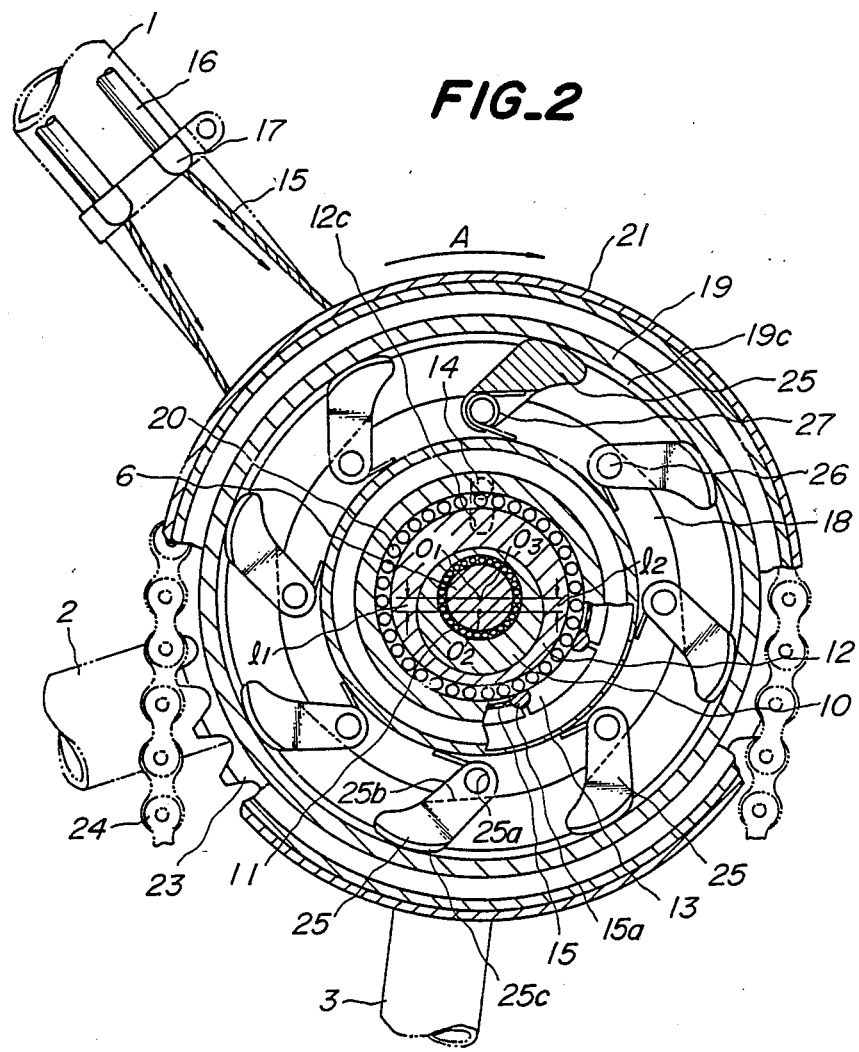
FIG. 2 is a sectional view taken along a line II—II in FIG. 1.

FIGS. 1 and 2 illustrate one embodiment of the stepless speed change device according to the invention. The drawings illustrate a front tube 1 (FIG. 2), a seat tube 2, a chain stay 3, a bottom bracket 4, a fixed cup 5 screwed into the bottom bracket 4, a crankshaft 6 provided rotatably relative to the fixed cup 5 through steel balls 7, a crank arm 8 fitted in a tapered portion 6a of the crankshaft 6, and a lock nut 9 for preventing the crank arm 8 from disengaging from the tapered portion 6a.

In this embodiment, an inner eccentric cam 10 having a center $O_2$ eccentric by $l_1$ to a center $O_1$ of the crankshaft 6 is formed integrally with the fixed cup 5. Rollers 11 are interposed between an inner circumference of the inner eccentric cam 10 and an outer circumference of the crankshaft 6.

An outer eccentric cam 12 having a center $O_3$ eccentric by $l_2$ to a center $O_2$ of the inner eccentric cam 10 is rotatable relative to and fitted on the inner eccentric cam 10. The outer eccentric cam 12 is formed by a small diameter portion 12a and a large diameter portion 12b to form a stepped portion. The outer eccentric cam 12 is formed in its inner surface with a groove 12c extending in radial directions. In this embodiment, the eccentricities $l_1$ and $l_2$ are equal.

On a flange 5a of the fixed cup 5 is rotatably arranged an annular wire reel 13 which on a side surface is formed a protrusion 14 fitted in the groove 12c of the outer eccentric cam 12. An operating wire 15 having a wire end 15a (FIG. 2) extends about the wire reel 13. The operating wire 15 has an outer wire 16 (FIG. 2) fixed to the front tube 1 by means of an outer wire fixture 17. A rotary member 18 on an input side substantially in the form of a circular disc is fixed to a hub 8a of the crank arm 8. A carrier 19 having a large diameter cylindrical body 19a and a small diameter cylindrical body 19b is rotatably fitted on an outer circumference of the outer eccentric cam 12 through steel balls 20. A rotary member 21 on an output side is fitted between an outer circumferences of the rotary member 18 on the input side and the wire reel 13 through steel balls 22 so as to surround the carrier 19. The rotary member 21 on the output side is integrally provided on its outer circumference with a sprocket 23 adapted to be engaged with a chain 24.

As shown in FIG. 2, a plurality of boot-shaped friction pieces 25 are provided which are formed at one ends or their bottoms with pivotal apertures 25a and pivotally or rockably fixed to the rotary member 18 by means of pins 26 equally spaced in a circle. Each of the friction pieces 25 is formed at the other end with a toe-shaped portion having a curved surface progressively away from the pivotal aperture 25a, and is further formed with a slit-shaped groove 25b for receiving a spring and with two inverted V-shaped ridges 25c side by side on the curved surface. A spring 27 is wound about the pin 26 to urge the curved surface of the friction piece 25 outwardly.

Figure 5:
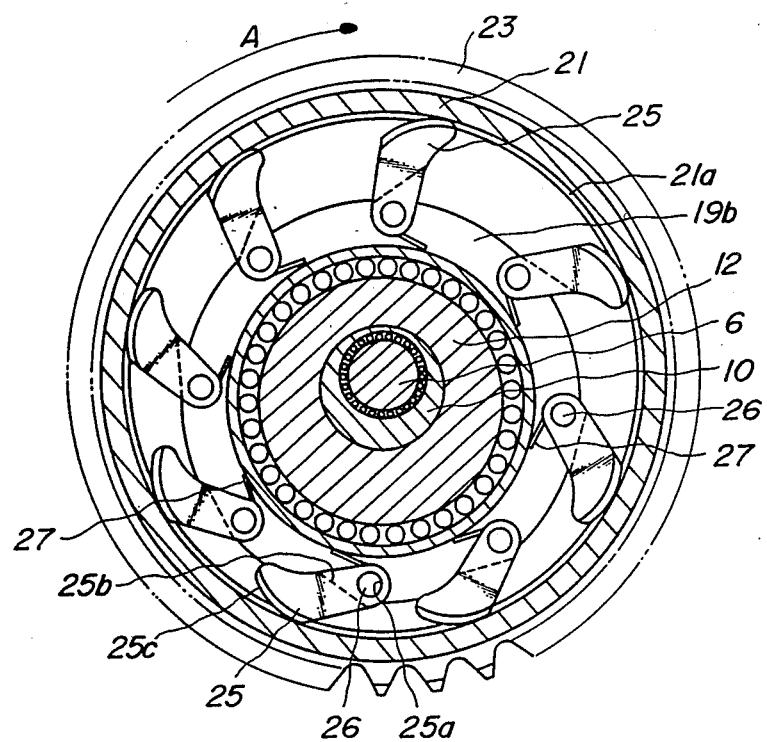
FIG. 5 is a sectional view taken along a line V—V in FIG. 1 for explaining the operation of the device with eccentricity.

The carrier 19 is formed in an inner surface of the large diameter cylindrical body 19a with V-shaped grooves 19c adapted to fit with the inverted V-shaped As shown in FIG. 5, the bottoms of the plurality (eight in this embodiment) of friction pieces 25 are pivotally connected by the pins 26 to an outer circumference of the small diameter body 19b of the carrier 19 equally spaced in a circle. The springs 27 are fitted about the pins 26 in the slit-shaped grooves 25b to urge the free ends of the friction pieces 25 outwardly.

The rotary member 21 on the output side is formed in an inner surface with two V-shaped grooves 21a adapted to fit with the inverted V-shaped ridges 25c of the friction pieces 25.

The device constructed as above described according to the invention operates in the following manner. The driving force is transmitted in the following sequence. When the crank arm 8 is rotated by crank pedal (not shown), the rotary member 18 on the input side integral with the crank arm 8 is rotated in a direction shown by an arrow A so that the carrier 19 is rotated through the pins 26, the friction pieces 25 and the V-shaped grooves 19c in the direction shown by the arrow A in FIG. 2. By the rotation of the carrier 19, the sprocket 23 is rotated in the direction A through the pins 26, the friction pieces 25, the V-shaped grooves 21a and the rotary member 21 on the output side, as a result of which a rear wheel (not shown) of the bicycle is driven through the chain 24.

In other words, in this device, the rotation is transmitted through the first speed change device including the friction pieces 25 and the V-shaped grooves 19c and the second speed change device including the friction pieces 25 and the V-shaped grooves 21a.

FIGS. 1 and 2 illustrate the outer eccentric cam 12 in the minimum eccentric position where the eccentricity is zero. In this case, the outer circumference of the outer eccentric cam 12 is concentric to the crankshaft 6. When the outer eccentric cam 12 is concentric to the crankshaft 6, the rotary member 18 on the input side, the carrier 19 and the rotary member 21 on the output side are also concentric to the crankshaft 6. Under this condition, when the rotary body 18 on the input side is rotated in the direction A in FIG. 2, the rotary member 21 on the output side is rotated together with the rotary member 18 on the input side through the friction pieces 25 engaging the V-shaped grooves 19c and 21a as shown in FIG. 2. Therefore, the speed change ratio in this case is 1:1.

Figure 3:
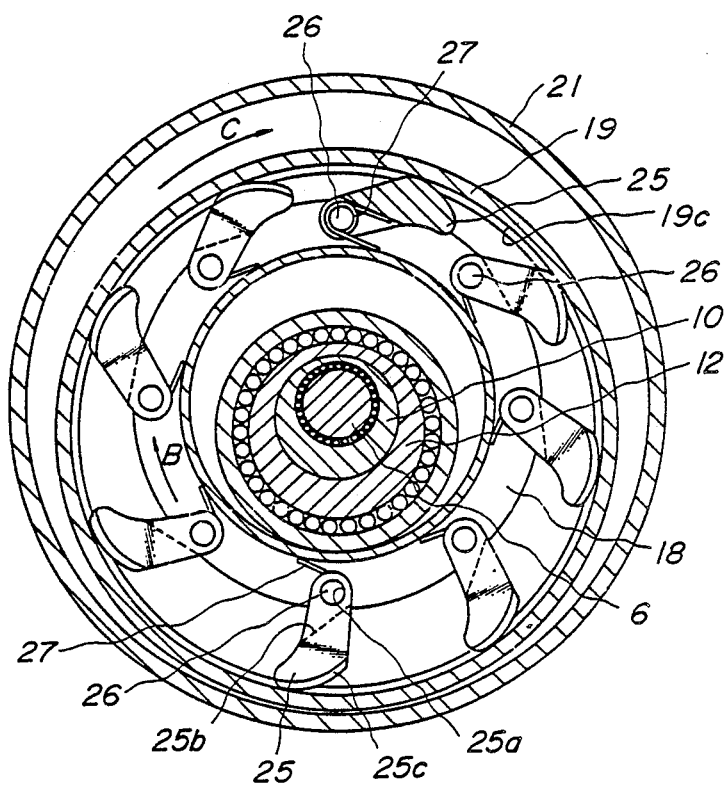
FIGS. 3 and 4 are views for explaining the operation of the device with the maximum eccentricity.
Figure 4:
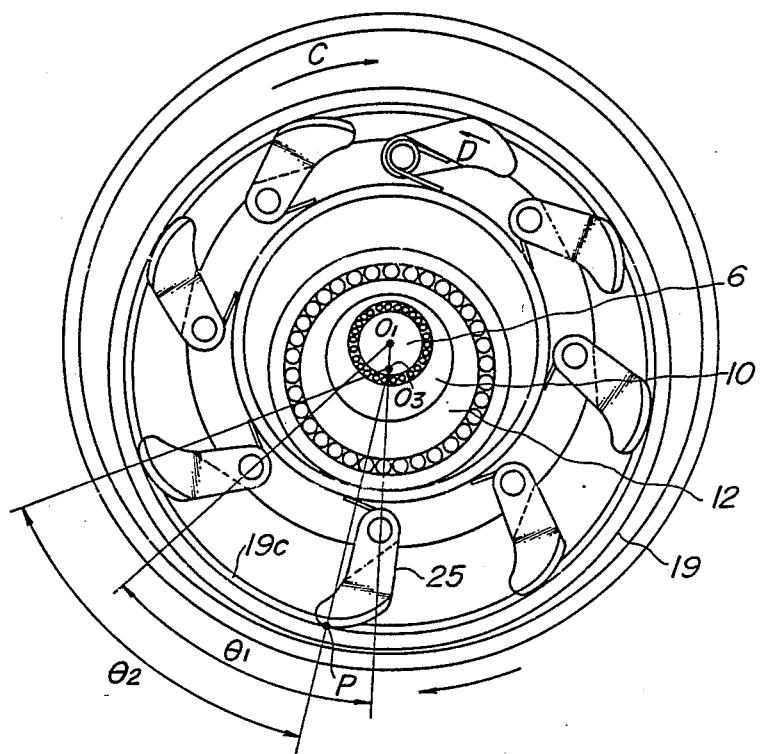

When the outer eccentric cam 12 is rotated by the operating wire 15 through 180° from the condition shown in FIG. 2 to the maximum eccentric position shown in FIGS. 3–5, rotation of the rotary member 18 on the input side in a direction shown by an arrow B in FIG. 3 causes the carrier 19 to rotate in a direction shown by an arrow C in FIG. 3 with the aid of the friction engagement of the lowermost friction piece 25 with the V-shaped groove 19c in FIG. 4.

In case that the outer eccentric cam 12 is eccentric, the speed change or speed increase ratio caused by the lowermost friction piece 25 shown in FIG. 4 is the maximum. Therefore, the carrier 19 is rotated with increasing speeds by means of the lowermost friction piece 25, while the other friction pieces 25 slide on the V-shaped grooves 19c in a direction shown by an arrow D in FIG. 4.

When the lowermost friction piece 25 starts to leave the driving zone, the next friction piece 25 enters the driving zone to assume the lowermost position to drive the carrier 19 with increasing speeds. In this manner, the friction pieces 25 progressively become the lowermost pieces to drive the carrier.

In this case, the speed change ratio (speed-up ratio) is a ratio of an angle $\theta_1$ of a driving zone of the lowermost friction piece 25 around the center $O_1$ of the crankshaft 6 to an angle $\theta_2$ of a driven zone of a contact point P between the lowermost friction piece 25 and the V-shaped grooves 19c around the center $O_3$ of the outer eccentric cam 12 as shown in FIG. 4. The maximum speed-up ratio of the first stage in this embodiment is approximately 1.3.

FIG. 5 illustrates a speed increasing condition of the device in the second stage when the eccentricity of the outer eccentric cam 12 is the maximum. In this case, the rotary member 21 on the output side is rotated at further increased speeds by the carrier 19 through the friction pieces 25 and the V-shaped grooves 21a. Since the speed-up operation in the second stage is substantially similar to that in the first stage, it will not be described in further detail.

In this embodiment, the maximum speed-up ratio in the second stage is also approximately 1.3. A total speed-up ratio becomes approximately 1.7 which is a product of 1.3 and 1.3.

The cases of the speed change ratio of 1:1 and the maximum speed change ratio have been explained. However, by setting the eccentricity of the outer eccentric cam 12 relative to the crankshaft 6 at any value between zero and the maximum, it is of course possible to change the speed in a stepless manner.

The device constructed as above described according to the invention is provided on a crankshaft 6 of a bicycle to connect a rotary member 18 on an input side to the crankshaft 6, and a sprocket 23 is integrally provided on a rotary member 21 on an output side so as to engage a chain 24, thereby obtaining a stepless speed change device on a side of the crankshaft, which is simple in construction and compact in a thin configuration.

Friction engaging portions of the friction pieces 25 and the V-shaped grooves 19c and 21a also serve as one-way clutches. Therefore, the speed change device according to the invention is particularly suited for use as a speed change device adapted to be provided on a crankshaft of a bicycle.

FIGS. 6–10 illustrate another embodiment of the stepless speed change device, wherein like components are designated by the same reference numerals as those in the first embodiment shown in FIGS. 1–5 and only different parts from those of the first embodiment will be explained hereinafter.

Figure 7:
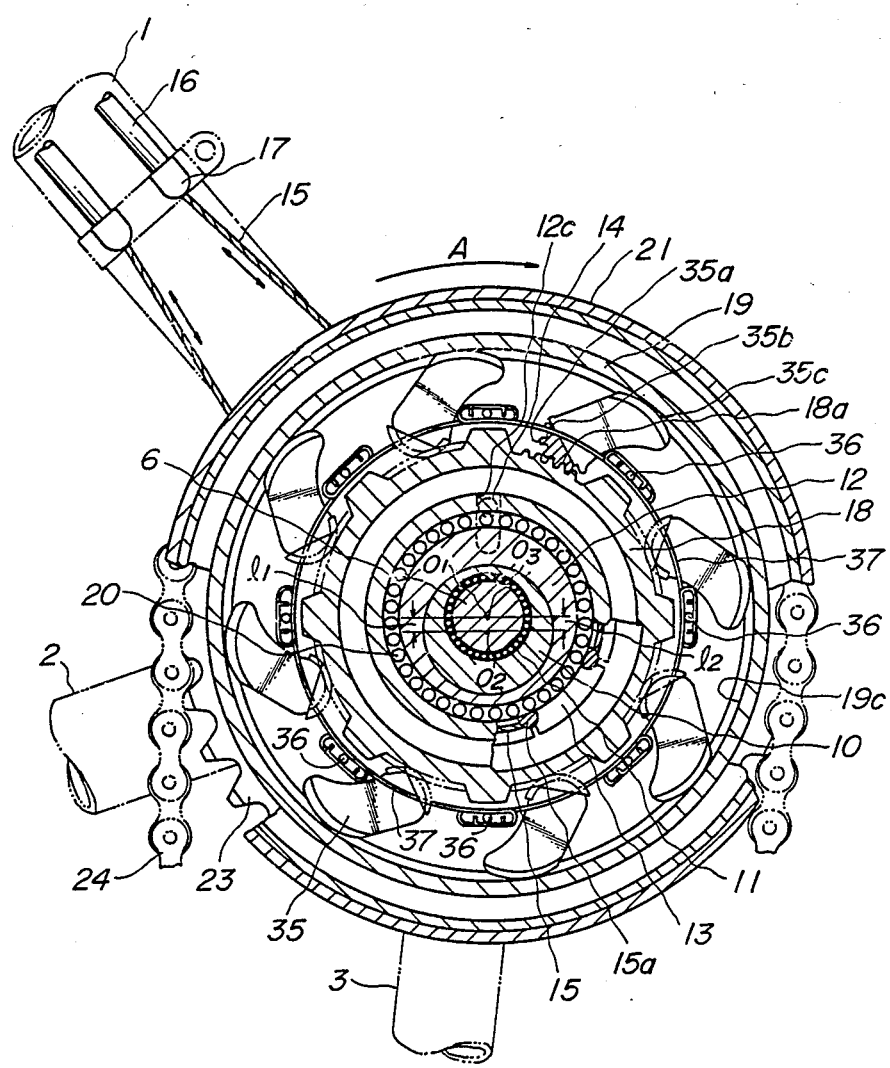
FIG. 7 is a sectional view taken along a line VII—VII in FIG. 6.

As shown in FIG. 7, a plurality (eight in this embodiment) of friction pieces 35 are provided which are formed at semicircular ends with teeth or sector gear 35a adapted to be engaged with teeth 18a formed in a circle on a rotary member 18 on an input side so that the friction pieces 35 are equally angularly spaced in a circle. Each of the friction pieces 35 is formed with a slit-shaped groove 35b for receiving a spring and each of the friction pieces 35 is formed at the other end with a curved surface progressively away from the semicircular end and with two inverted V-shaped ridges 35c side by side on the other end. The rotary member 18 is formed with spring hooks 36, about which each of two adjacent spring hooks 36 a spring 37 is extended, respectively. The springs 37 engage the slit-shaped grooves 35b of the friction pieces 35 to urge their free ends outwardly so as to cause the friction pieces 35 to extend in radial directions.

A carrier 19 is formed in an inner surface of a large diameter cylindrical body 19a with V-shaped grooves 19c adapted to fit with the inverted V-shaped ridges 35c of the friction pieces 35.

Figure 10:
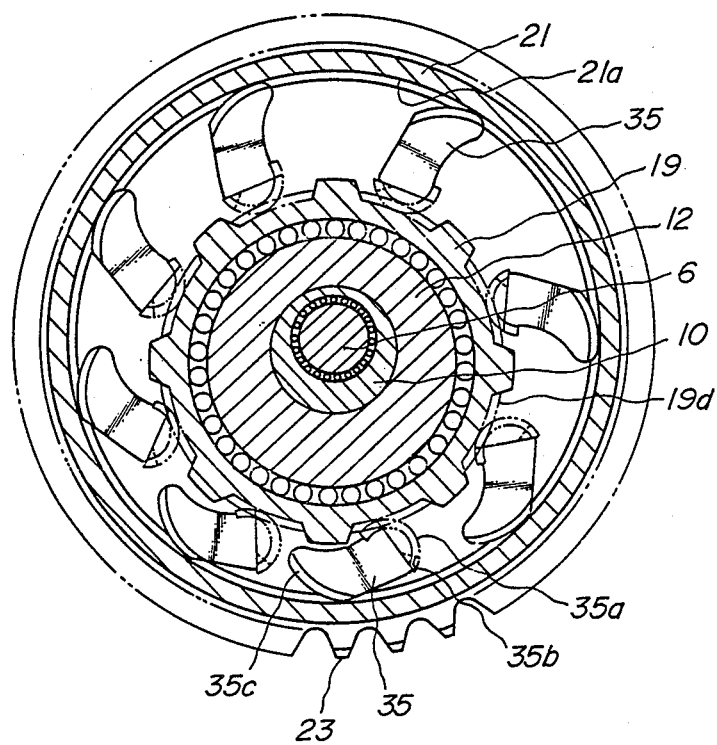
FIG. 10 is a sectional view taken along a line X—X in FIG. 6 for explaining the operation of the device with the eccentricity.

As shown in FIG. 10, the sector gears 35a formed in the semicircular ends of the plurality (eight in this embodiment) of friction pieces 35 are engaged with teeth 19d of a gear provided in a circle on an outer circumference of a small diameter body 19b of a carrier 19 to arrange the friction pieces 35 equally spaced in a circle. The spring 37 extending about the spring hook 36 are engaged with the slit-like grooves 35b to urge the free ends of the friction pieces 35 outwardly so as to cause the friction pieces 35 to extend in radial directions.

The rotary member 21 on the output side is formed in an inner surface with two V-shaped grooves 21a adapted to fit with the inverted V-shaped ridges 35c of the friction pieces 35.

The device constructed as above described according to the invention operates in the following manner. The driving force is transmitted in the following sequence.

When the crank arm 8 is rotated by crank pedal (not shown), the rotary member 18 on the input side integral with the crank arm 8 is rotated in a direction shown by an arrow A so that the carrier 19 is rotated through the teeth 18a and 35a, the friction pieces 35, the inverted V-shaped ridges 35c and the V-shaped grooves 19c in the direction shown by the arrow A. By the rotation of the carrier 19, the sprocket 23 is rotated in the direction A through the teeth 18a and 35a, the friction pieces 35, the inverted V-shaped ridges 35c, the V-shaped grooves 21a and the rotary member 21 on the output side, as a result of which a rear wheel (not shown) of the bicycle is driven through the chain 24.

In this embodiment, the rotation is transmitted through the first speed change device including the friction pieces 35 and the V-shaped grooves 19c and the second speed change device including the friction pieces 35 and the V-shaped grooves 21a in the similar manner to that in the first embodiment.

Figure 6:
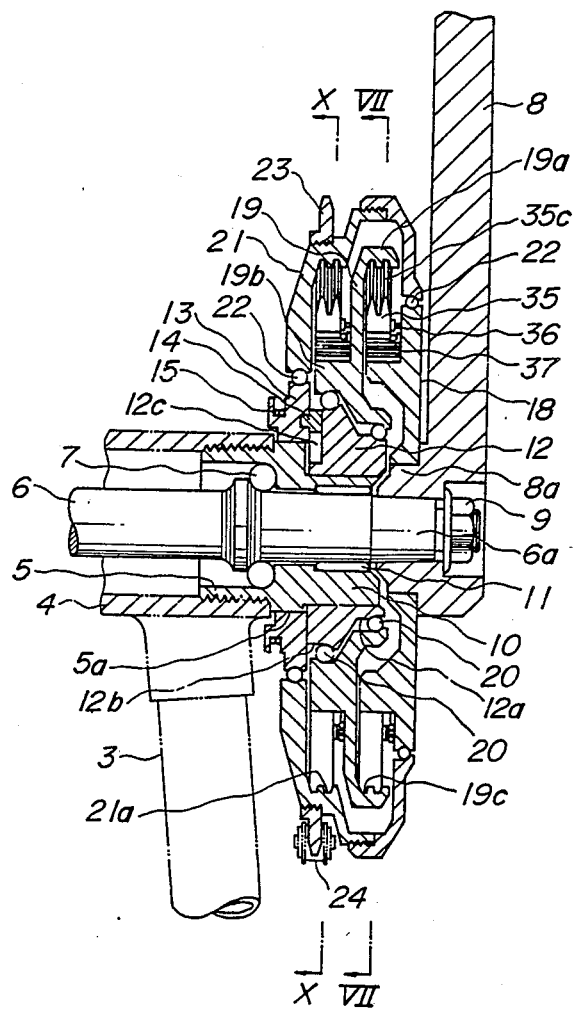
FIG. 6 is a sectional view of another embodiment of the stepless speed change device according to the invention.

Moreover, FIGS. 6 and 7 illustrate the outer eccentric cam 12 in the minimum eccentric position as shown in FIGS. 1 and 2. The speed change ratio in this case is also 1:1.

Figure 8:
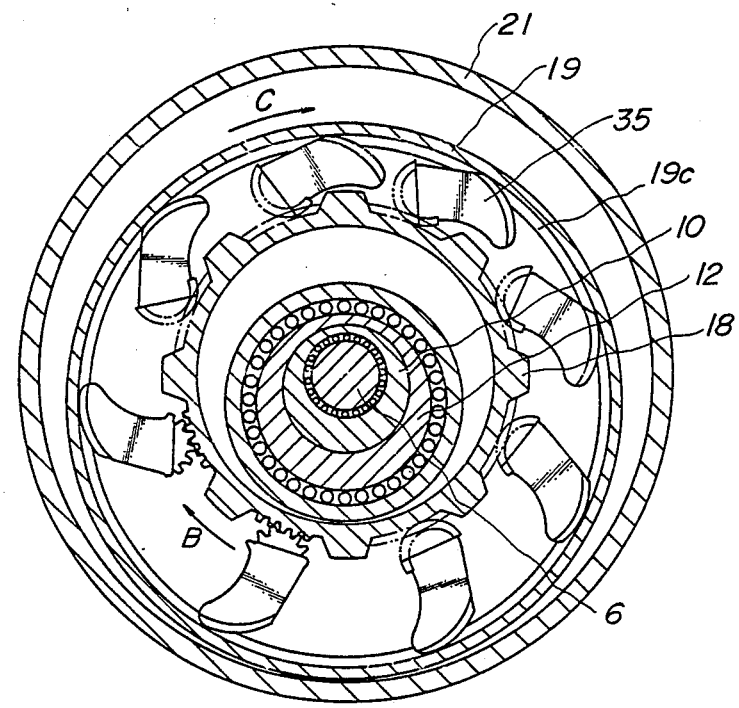
FIGS. 8 and 9 are views for explaining the operation of the device with the maximum eccentricity.
Figure 9:
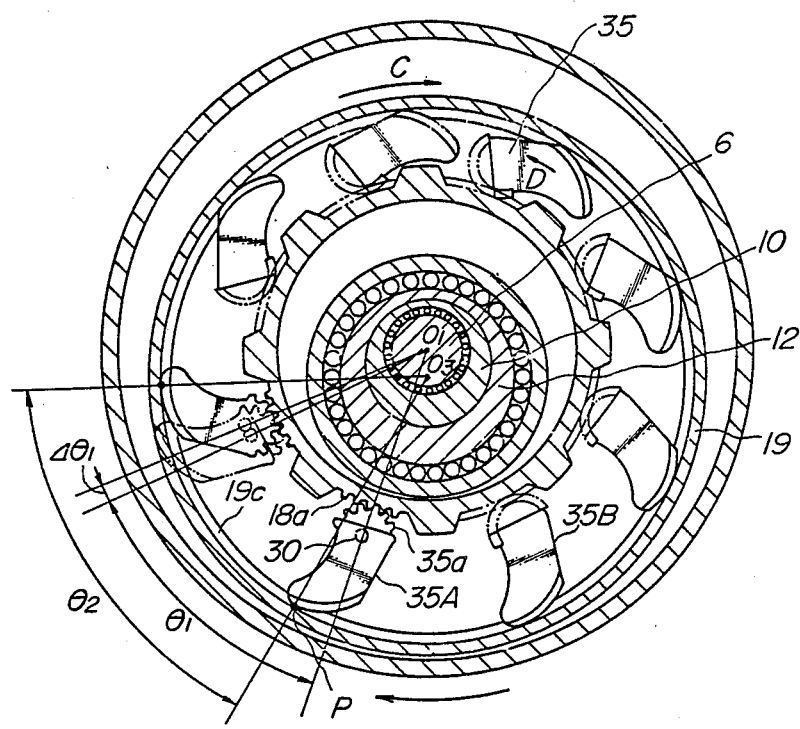

When the outer eccentric cam 12 is rotated by the operating wire 15 through 180° from the condition shown in FIG. 7 to the maximum eccentric position shown in FIGS. 8–10, the rotation of the rotary member 18 on the input side in a direction shown by an arrow B in FIG. 8 causes the carrier 19 to rotate in a direction shown by an arrow C in FIG. 8 with the aid of the friction engagement of the lower friction piece 35A with the V-shaped groove 19c in FIG. 9.

In this case, the speed change ratio (speed-up ratio) is a ratio of an angle $\theta_1$ of a driving zone of the friction piece 35A around the center $O_1$ of the crankshaft 6 to an angle $\theta_2$ of a driven zone of a contact point P between the friction piece 35A and the V-shaped grooves 19c around the center $O_3$ of the outer eccentric cam 12 as shown in FIG. 9. In this embodiment, the engagement of the teeth 35a and 18a of the friction pieces 35 and the rotary member 18 on the input side causes rolling of the friction pieces. Therefore, the friction pieces 35 are rockable relative to the rotary member 18. On the other hand, on the output side, the friction pieces 35 are rockable relative to the rotary member 21. In comparison of this case with that of friction pieces whose bottom ends are pivotally connected to the rotary member 18 on the input side by means of pins 30 shown in phantom lines in FIG. 9 without providing the teeth 35a and 18a, the friction pieces in this embodiment advance ahead of the friction pieces shown i the phantom line by a distance corresponding to an angle $\Delta\theta_1$ in FIG. 9. Therefore, the driven angle $\theta_2$ becomes larger so that the speed-up ratio becomes larger correspondingly. The maximum speed-up ratio in the first stage of this embodiment is approximately 1.4.

FIG. 10 illustrates a speed increasing condition of the device in the second stage when the eccentricity of the outer eccentric cam 12 is the maximum. In this embodiment, the maximum speed-up ratio in the second stage is also approximately 1.4. A total speed-up ratio becomes approximately 2.0 which is a product of 1.4 and 1.4.

According to this embodiment, the bottom ends of the friction pieces 35 are formed with the sector gears 35a adapted to engage the gears 18a and 19d provided on the carrier 19. Therefore, the rocking zone of the friction pieces 35 increases in transmitting with changing speeds in comparison with that of friction pieces whose bottoms are pivoted thereby increasing the speed-up ratio.

FIGS. 11-15 illustrate a further embodiment of the stepless speed change device, wherein like components are designated by the same reference numerals as those in the first embodiment shown in FIGS. 1-5 and only different parts from those of the first embodiment will be explained hereinafter.

An outer eccentric cam 12 having a center $O_3$ eccentric by $l_2$ to a center $O_2$ of the inner eccentric cam 10 is rotatable relative to and fitted on the inner eccentric cam 10 through rollers 43. The outer eccentric cam 12 is formed in its inner surface with a groove 42a extending in radial directions. In this embodiment, the eccentricities $l_1$ and $l_2$ are equal.

On a flange 5a of the fixed cup 5 is rotatably arranged an annular wire reel 44 which is formed with on a side surface with a protrusion 45 fitted in the groove 42a of the outer eccentric cam 12. An operating wire 46 having a wire end 46a (FIG. 13) extends about the wire reel 44. The operating wire 46 has an outer wire 47 (FIGS. 12 and 13) fixed to the front tube 1 by means of an outer wire fixture 48.

An annular carrier 50 is rotatably provided on an outer circumference of the outer eccentric cam 12 through rollers 49 and is formed in an outer circumference with two annular grooves 50a and 50b. Bottom ends of a plurality (eight in this embodiment) of friction pieces 51 are inserted in the outer annular grooves 50a and pivotally or rockably connected thereto by means of pins 52 shown in FIG. 14. Free ends of the friction pieces 51 are urged outwardly by means of springs 53.

Figure 12:
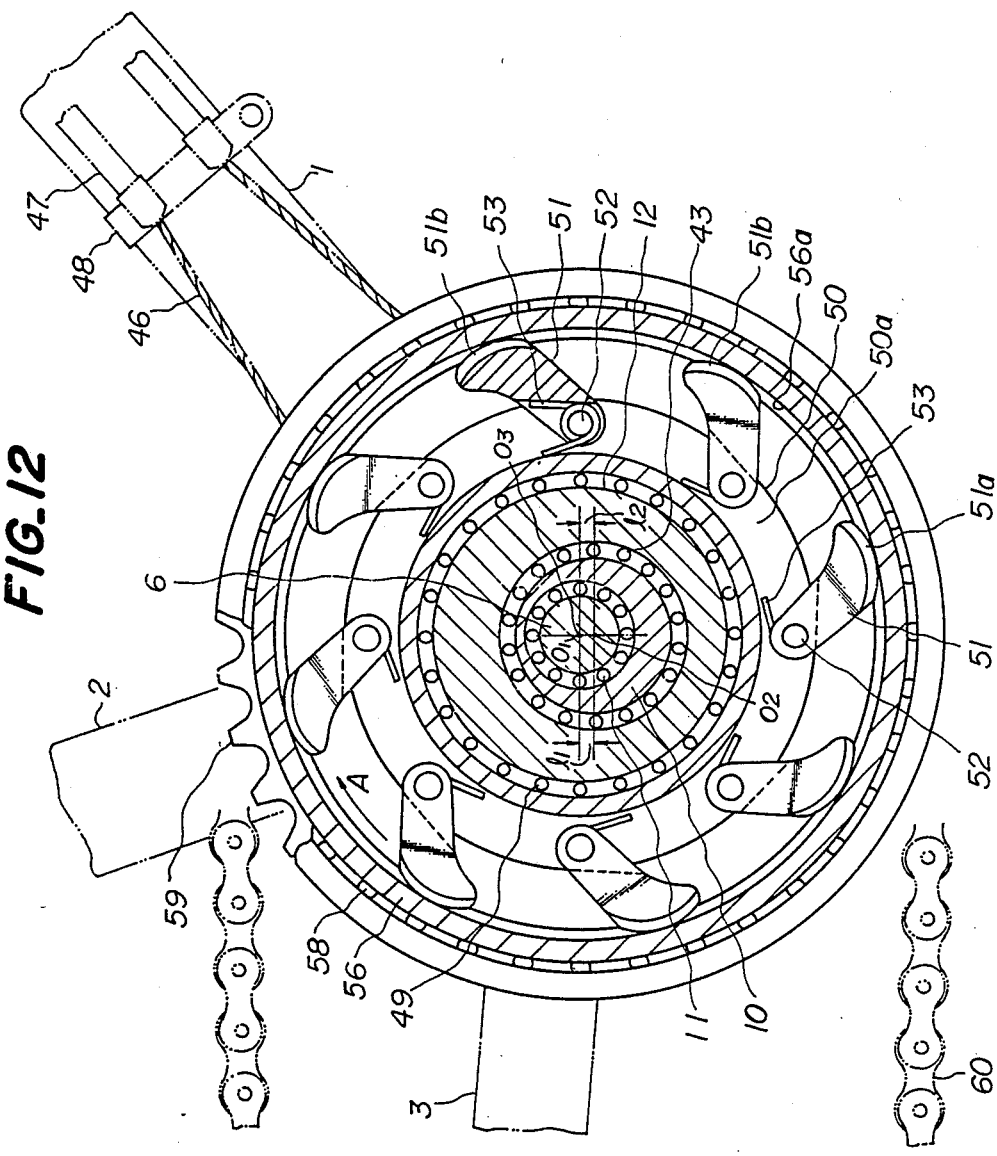
FIG. 12 is a sectional view taken along a line XII—XII in FIG. 11.

The friction pieces 51 are arranged with their free ends inclined in the counterclockwise direction viewed in FIG. 12. An outer end surface 51a at the free end of each of the friction pieces 51 is a curved surface progressively away from the pin 52 and formed with two inverted V-shaped ridges 51b side by side.

Figure 13:
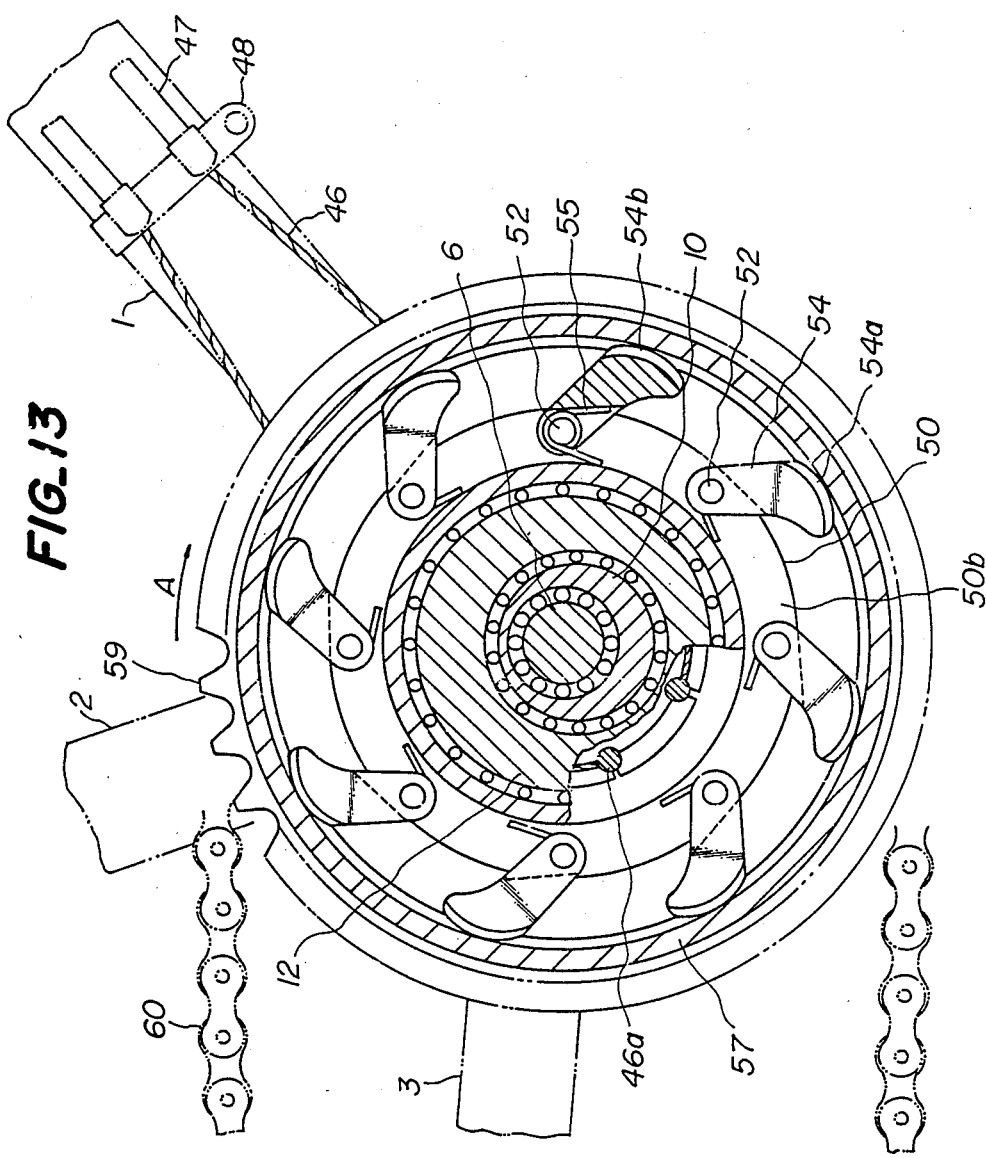
FIG. 13 is a sectional view taken along a line XII—XII in FIG. 11.

Bottom ends of a plurality (eight in this embodiment) of friction pieces 54 are inserted in the inner annular grooves 50b and pivotally or rockably connected thereto by means of the above described pins 52 shown in FIG. 13. Free ends of the friction pieces 54 are urged outwardly by means of spring 55.

The friction pieces 54 are arranged with their free ends inclined in the clockwise direction viewed in FIG. 13. An outer end surface 54a at the free end of each of the friction pieces 54 is a curved surface progressively away from the pins 52 and formed with two inverted V-shaped ridges 54b side by side.

A rotary member 56 on an input side substantially in the form of a circular disc is fixed to a hub 8a of the crank arm 8. The rotary member 56 is formed on inside of its outer portion with two V-shaped grooves 56a adapted to fit with the inverted V-shaped ridges 51b of the friction pieces 51.

A rotary member 57 on an output side enclosing the rotary member 56 on the input side and the friction pieces 54 pivoted to the carrier 50 is rotatably provided between the outer circumferences of the rotary member 56 on the input side and the wire reels 44 through steel balls 58. The rotary member 57 on the output side is integrally formed on its outer circumference with a sprocket 59. The rotary member 57 is formed in its inner circumference with two V-shaped grooves 57a adapted to be fitted with the ridges 54b of the friction pieces 54. A chain 60 is trained about the sprocket 59.

The device constructed as above described according to the invention operates in the following manner. The driving force is transmitted in the following sequence. When the crank arm 8 is rotated by crank pedal (not shown), the rotary member 56 on the input side integral with the crank arm 8 is rotated in a direction shown by an arrow A in FIG. 12 so that the carrier 50 is rotated through the pins 52, the friction pieces 51 and the ridges 51b and the V-shaped grooves 56a in the direction shown by the arrow A in FIG. 12. By the rotation of the carrier 50, the sprocket 59 is rotated in the direction A in FIG. 13 through the pins 52, the friction pieces 54, the V-shaped grooves 57a and the rotary member 57 on the output side, as a result of which a rear wheel (not shown) of the bicycle is driven through the chain 60.

In other words, in this device, the rotation is transmitted through the first speed change device including the friction pieces 51 and the V-shaped grooves 56a and the second speed change device including the friction pieces 54 and the V-shaped grooves 57a.

Figure 11:
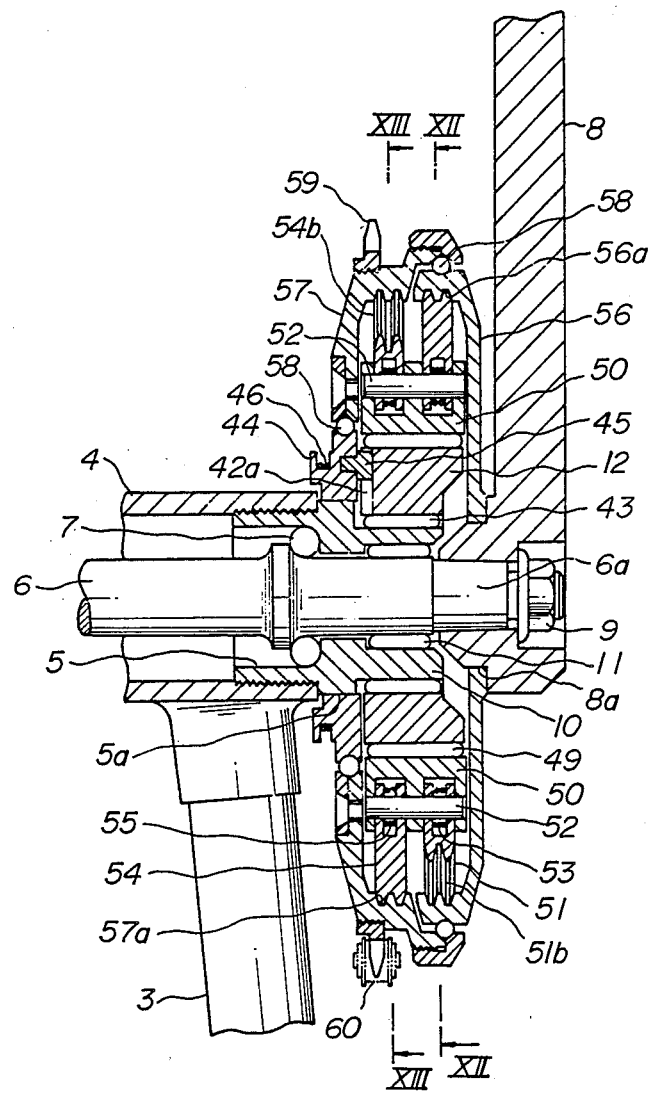
FIG. 11 is a sectional view of a further embodiment of the stepless speed change device according to the invention.

FIGS. 11-13 illustrate the outer eccentric cam 12 in the minimum eccentric position where the eccentricity is zero. In this case, the outer circumference of the outer eccentric cam 12 is concentric to the crankshaft 6. When the outer eccentric cam 12 is concentric to the crankshaft 6, the rotary member 56 on the input side, the carrier 50 and the rotary member 57 on the output side are also concentric to the crankshaft 6. Under this condition, when the rotary body 56 on the input side is rotated in the direction A in FIG. 12, the rotary member 57 on the output side is rotated together with the rotary member 56 on the input side through the friction pieces 51 and 54 engaging as shown in FIGS. 12 and 13. Therefore, the speed change ratio in this case is 1:1.

Figure 14:
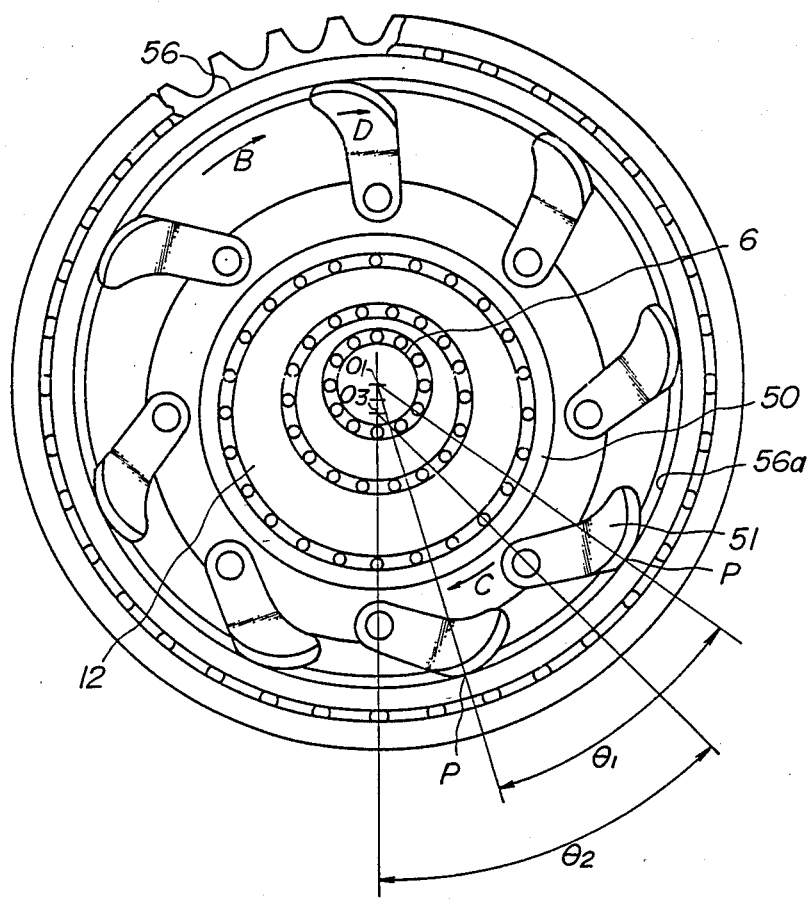
FIGS. 14 and 15 are views for explaining the operation of the device with the maximum eccentricity in FIG. 13.
Figure 15:
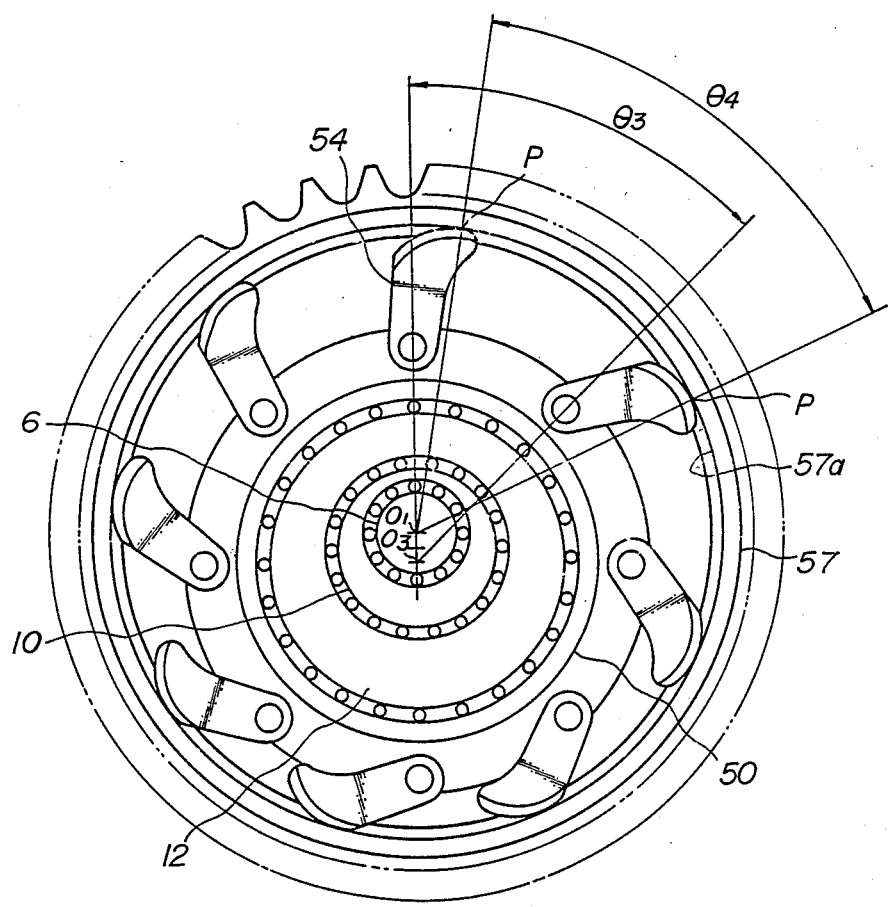

When the outer eccentric cam 12 is rotated by the operating wire 46 through 180° from the condition shown in FIGS. 12 and 13 to the maximum eccentric position shown in FIGS. 14 and 15, the rotation of the rotary member 56 on the input side in a direction shown by an arrow B in FIG. 14 causes the carrier 50 to rotate in a direction shown by an arrow C in FIG. 14 with the aid of the friction engagement of the lower friction piece 51 with the V-shaped groove 56a in FIG. 14.

In case that the outer eccentric cam 12 is eccentric, the speed change or speed increase ratio caused by the lower friction piece 51 shown in FIG. 14 is the maximum. Therefore, the carrier 50 is rotated with increasing speeds by means of the lower friction piece 51, while the other friction pieces 51 slide on the V-shaped grooves 56a in a direction shown by an arrow D in FIG. 14.

When the lower friction piece 51 starts to leave the driving zone, the next friction piece 51 enters the driving zone to assume the lower position to drive the carrier 50 with increasing speeds. In this manner, the friction pieces 51 progressively become the lower pieces to drive the carrier.

In this case, the speed change ratio (speed-up ratio) is a ratio of an angle $\theta_1$ of a driving zone of a contact point P between the lower friction piece 51 and the V-shaped grooves 56a around the center $O_1$ of the crankshaft 6 and an angle $\theta_2$ of a driven zone of the lower friction piece 51 about the center $O_3$ of the outer eccentric cam 12 as shown in FIG. 14. The maximum speed-up ratio of the first stage in this embodiment is approximately 1.3.

FIG. 15 illustrates a speed increasing condition of the device in the second stage when the eccentricity of the outer eccentric cam 12 is the maximum. In this case, the rotary member 57 on the output side is rotated at further increased speeds by the carrier 50 through the friction pieces 54 and the V-shaped grooves 57a. The speed-up ratio in the second stage is as follows.

Referring to FIG. 15, the speed-up ratio in the second stage is a ratio of an angle $\theta_3$ in a driving zone of the uppermost friction piece 54 about the center $O_1$ of the crankshaft 6 and an angle $\theta_4$ in a driven zone of a contact point P between the uppermost friction piece 54 and the V-shaped grooves 57a about the center $O_3$ of the outer eccentric cam 12. In this embodiment, the maximum speed-up ratio $\theta_4/\theta_3$ in the second stage is also approximately 1.3. A total speed-up ratio becomes approximately 1.7 which is a product of 1.3 and 1.3.

According to this embodiment, the bottoms of a plurality of rows of the friction pieces 51 and 54 are pivotally connected to the carrier 50, the carrier 50 is not constructed in a cantilever and the pivotal pins 52 are commonly used for the friction pieces 51 and 54. Therefore, the stepless speed change device according to the invention is simple in construction and easy to manufacture and assemble and achieves improved strength, light weight and compact construction.

FIGS. 16-20 illustrate another embodiment of the stepless speed change device, wherein like components are designated by the same reference numerals as those in the third embodiment shown in FIGS. 11-15.

An outer eccentric cam 12 having a center $O_3$ eccentric by $l_2$ to a center $O_2$ of the inner eccentric cam 10 is rotatable relative to and fitted on the inner eccentric cam 10 through rollers 43. The outer eccentric cam 12 is formed in its inner surface with a groove 42a extending in radial directions. In this embodiment, the eccentricities $l_1$ and $l_2$ are equal.

On a flange 5a of the fixed cup 5 is rotatably arranged an annular wire reel 44 which is formed with on a side surface with a protrusion 45 fitted in he groove 42a of the outer eccentric cam 12. An operating wire 46 having a wire end 46a (FIG. 18) extends about the wire reel 44. The operating wire 46 has an outer wire 47 (FIGS. 10 and 17) fixed to the front tube 1 by means of an outer wire fixture 48.

An annular carrier 70 is rotatably provided on an outer circumference of the outer eccentric cam 12 through rollers 49 and is formed on an outer circumference with teeth 70a of a gear.

Figure 16:
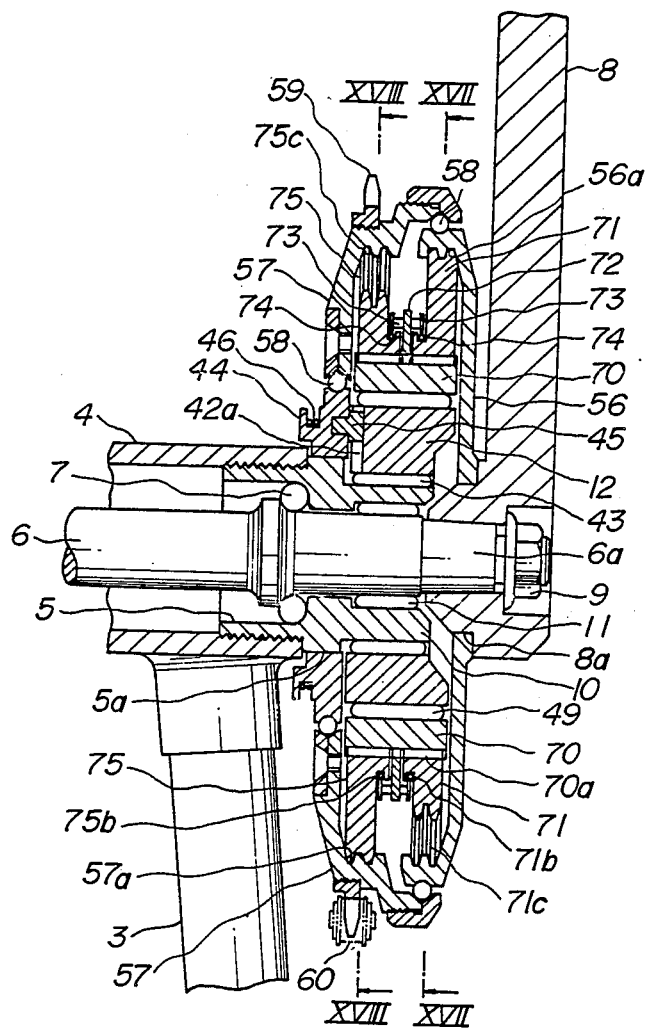
FIG. 16 is a sectional view of an additional embodiment of the stepless speed change device according to the invention.
Figure 17:
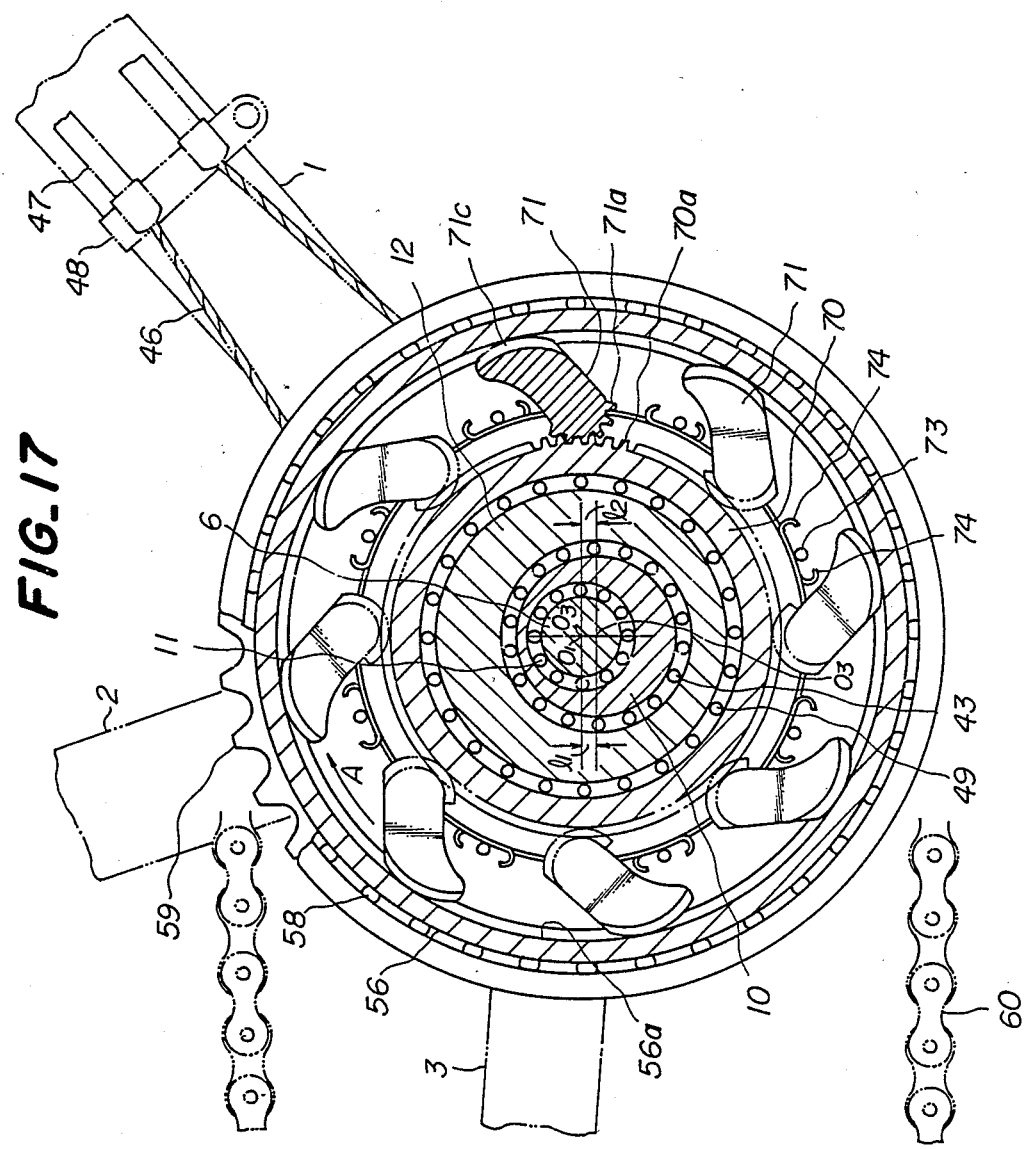
FIG. 17 is a sectional view taken along a line XVII—XVII in FIG. 1.

As shown in FIG. 17, a plurality (eight in this embodiment) of friction pieces 71 are provided which are formed at semicircular ends with teeth or sector gears 71a adapted to be engaged with teeth 70a formed in a circle on the carrier 70 so that the friction pieces 71 are equally angularly spaced in a circle. Each of the friction pieces 71 is formed with a slit-shaped groove 71b (FIG. 16) for receiving a spring and each of the friction pieces 71 is formed at the other end with a curved surface progressively away from the semicircular end and with two inverted V-shaped ridges 71c side by side on the other end. A ring 72 is fitted on a center of the teeth 70a. The ring 72 is formed with spring hooks 73 about which each two adjacent spring hooks a spring 74 is extended, respectively. The springs 74 engage the slitshaped grooves 71b of the friction pieces 71 to urge their free ends outwardly so as to cause the friction pieces 71 to extend in radial directions.

Figure 18:
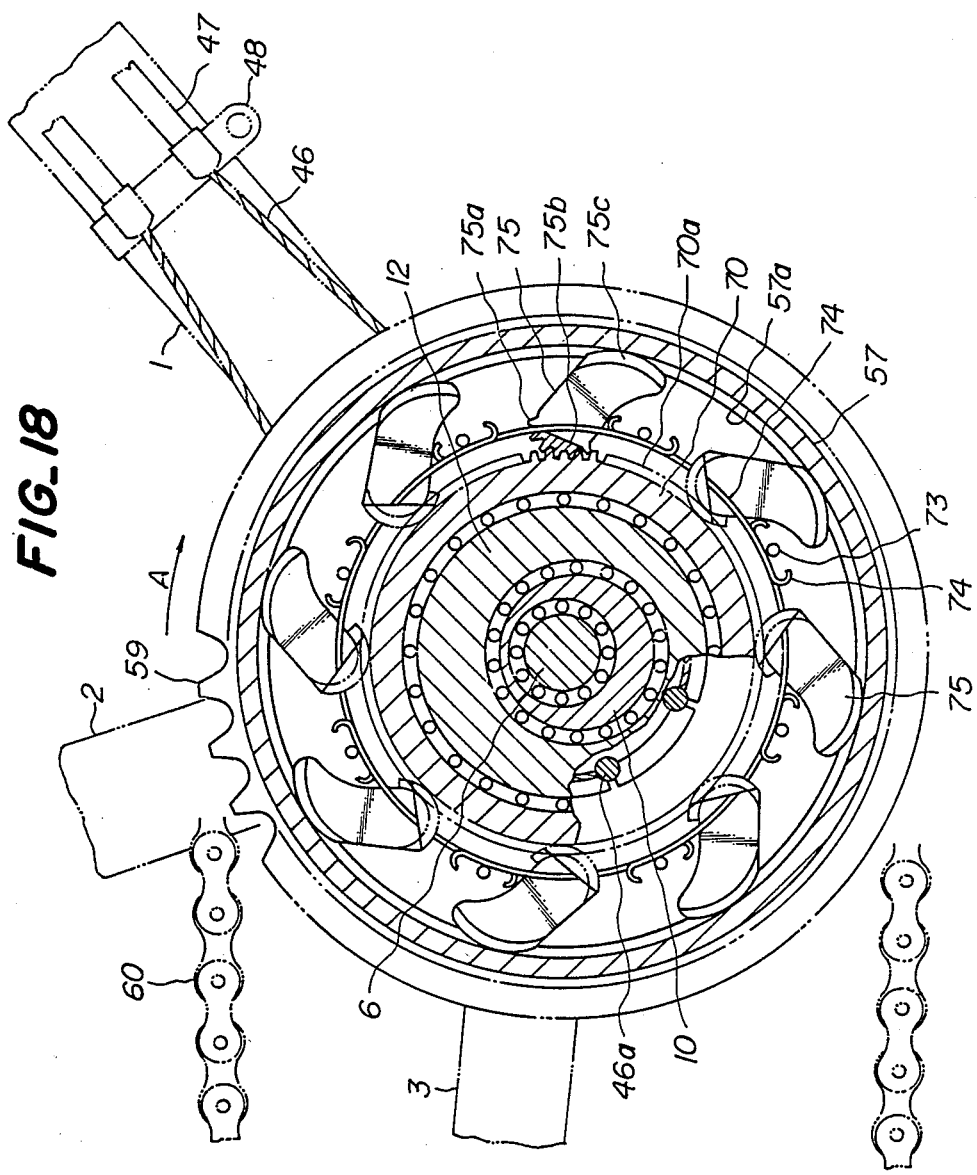
FIG. 18 is a sectional view taken along a line XVIII—XVIII in FIG. 16.

As shown in FIG. 18, a plurality of friction pieces 75 are provided which are formed at semicircular ends with teeth or sector gears 75a adapted to be engaged with teeth 70a formed in a circle on the carrier 70 so that the friction pieces 75 are equally angularly spaced in a circle. Each of the friction pieces 75 is formed with a slit-shaped groove 75b (FIG. 16) for receiving a spring and each of the friction pieces 75 is formed at the other end with a curved surface progressively away from the semicircular end and with two inverted V-shaped ridges 75c side by side on the other end. Springs 74 extends about the two adjacent spring hooks formed on the ring 72. The springs 74 engage the slit-shaped grooves 75b of the friction pieces 75 to urge their free ends outwardly so as to cause the friction pieces 75 to extend in radial directions.

A rotary member 56 on an input side substantially in the form of a circular disc is fixed to a hub 8a of the crank arm 8. The rotary member 56 is formed on inside of its outer portion with two V-shaped grooves 56a adapted to fit with the inverted V-shaped ridges 71c of the friction pieces 71.

A rotary member 57 on an output side enclosing the rotary member 56 on the input side and the friction pieces 75 pivoted to the carrier 70 is rotatably provided between the outer circumferences of the rotary member 56 on the input side and the wire reels 44 through steel balls 58. The rotary member 57 on the output side is integrally formed on its outer circumference with a sprocket 59. The rotary member 57 is formed in its inner circumference with two V-shaped grooves 57a adapted to be fitted with the ridges 75c of the friction pieces 75. A chain 60 is trained about the sprocket 59.

The device constructed as above described according to the invention operates in the following manner. The driving force is transmitted in the following sequence. When the crank arm 8 is rotated by crank pedal (not shown), the rotary member 56 on the input side integral with the crank arm 8 is rotated in a direction shown by an arrow A in FIG. 17 so that the carrier 70 is rotated through the V-shaped grooves 56a, the ridges 51c, the friction pieces 71 and teeth 71a and 70a in the direction shown by the arrow A in FIG. 17. By the rotation of the carrier 70, the sprocket 59 is rotated in the direction A in FIG. 18 through the teeth 70a and 75a, the friction pieces 75, the ridges 75c, the V-shaped grooves 57a and the rotary member 57 on the output side, as a result of which a rear wheel (not shown) of the bicycle is driven through the chain 60.

In other words, in this device, the rotation is transmitted through the first speed change device including the friction pieces 71 and the V-shaped grooves 56a and the second speed change device including the friction pieces 75 and the V-shaped grooves 57a.

FIGS. 16-18 illustrate the outer eccentric cam 12 in the minimum eccentric position where the eccentricity is zero. In this case, the outer circumference of the outer eccentric cam 12 is concentric to the crankshaft 6. When the outer eccentric cam 12 is concentric to the crankshaft 6, the rotary member 56 on the input side the carrier 70 and the rotary member 57 on the output side are also concentric to the crankshaft 6. Under this condition, when the rotary body 56 on the input side is rotated in the direction A in FIG. 17, the rotary member 57 on the output side is rotated together with the rotary member 56 on the input side through the friction pieces 71 engaging the V-shaped grooves 56a, the carrier 70, the friction pieces 75 and the V-shaped grooves 57a. Therefore, the speed change ratio in this case is 1:1.

When the outer eccentric cam 12 is rotated by the operating wire 46 through 180° from the condition shown in FIGS. 17 and 18 to the maximum eccentric position shown in FIGS. 19 and 20, the rotation of the rotary member 56 on the input side in a direction shown by an arrow B in FIG. 19 causes the carrier 70 to rotate in a direction shown by an arrow C in FIG. 19 with the aid of the friction engagement of the lower friction piece 71 with the V-shaped groove 56a in FIG. 19.

In case that the outer eccentric cam 12 is eccentric, the speed change or speed increase ratio caused by the lower friction piece 71 shown in FIG. 19 is the maximum. Therefore, the carrier 70 is rotated with increasing speeds by means of the lower friction piece 71, while the other friction piece 71 slide on the V-shaped grooves 56a in a direction shown by an arrow D in FIG. 19.

When the lower friction piece 71 starts to leave the driving zone, the next friction piece 71 enters the driving zone to assume the lower position to drive the carrier 70 with increasing speeds. In this manner, the friction pieces 71 progressively become the lower pieces to drive the carrier.

In this case, the speed change ratio (speed-up ratio) is a ratio ($\theta_2/\theta_1$) of an angle $\theta_1$ of a driving zone of a contact point P between the lower friction piece 71 and the V-shaped grooves 56a around the center $O_1$ of the crankshaft 6 to an angle $\theta_2$ of a driven zone of the friction piece 71 about the center $O_3$ of the outer eccentric cam 12 as shown in FIG. 19. In this embodiment, the engagement of the teeth 71a and 70a of the friction pieces 71 and the carrier 70 causes rolling of the friction pieces. Therefore, the friction pieces 71 are rockable relative to the carrier 70. On the output side, the friction pieces 75 are also rockable relative to the carrier 70. In comparison of this case with that of friction pieces whose bottom ends are pivotally connected to the carrier 70 by means of pins 31 shown in phantom lines in FIG. 19 without providing the teeth 71a and 70a, the friction pieces in this embodiment advance ahead of the friction pieces show in the phantom lines by a distance corresponding to an angle $\Delta\theta_1$ in FIG. 19. Therefore, the driven angle $\theta_2$ becomes larger so that the speed-up ratio becomes larger correspondingly. The maximum speed-up ratio $\theta_2\theta_1$ in the first stage of this embodiment is approximately 1.4.

FIG. 20 illustrates a speed increasing condition of the device in the second stage when the eccentricity of the outer eccentric cam 12 is the maximum. In this case, the rotary member 57 on the output side is rotated at further increased speeds by the carrier 70 through the friction pieces 75 and the V-shaped grooves 57a. The speed-up ratio in the second stage is as follows.

Referring to FIG. 20, the speed-up ratio in the second stage is a ratio ($\theta_4/\theta_3$) of an angle $\theta_4$ in a driven zone of a contact point P between the upper friction piece 75 and the V-shaped grooves 57a about the center $O_1$ of the crankshaft 6 to an angle $\theta_3$ in a driving zone of the upper friction piece 54 about the center $O_3$ of the outer eccentric cam 12. In this embodiment, the maximum speed-up ratio $\theta_4/\theta_3$ in the second stage is also approximately 1.4. A total speed-up ratio becomes approximately 2.0 which is a product of 1.4 and 1.4.

According to this embodiment shown in FIGS. 16–20, the speed-up ratio is increased with the aid of the sector gears adapted to engage the gears provided on the carrier 70 in the similar manner as in the second embodiment shown in FIGS. 6–10.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A stepless speed change device comprising an eccentric cam assembly whose eccentricity is adjustable relative to a center shaft, a carrier rotatably arranged about said eccentric cam assembly, rotary members on input and output sides of said device, respectively, and a plurality of friction pieces arranged in two rows, each row including a plurality of the friction pieces, said friction pieces being rockably connected to said carrier such that free ends of said friction pieces in one row engage an inside of the rotary member on the input side over a substantially constant contact area and free ends of said friction pieces in the other row engage an inside of the rotary member on the output side over a substantially constant contact area.

2. The stepless speed change device of claim 1, wherein each of said friction pieces is formed with a sector gear on the end to which each friction piece is rockably connected to said carrier, said sector gear being engaged with a gear formed on the carrier.

3. A stepless speed change device comprising:
an eccentric cam assembly whose eccentricity is adjustable relative to a center shaft;
a carrier rotatably arranged about said eccentric cam assembly;
rotary members on input and output sides of said device, respectively;
a first row of friction pieces rockably connected to said rotary member on the input side of said device, each of said friction pieces being formed with a sector gear on the rockably connected end, said sector gear being engaged with a gear formed on the rotary member on the input side, and free ends of the friction pieces being engaged with an inside of said carrier over a substantially constant contact area; and
a second row of friction pieces rockably connected to said carrier, each of said friction pieces being formed with a sector gear on the rockably connected end, said sector gear being engaged with a gear formed on the carrier, and free ends of the friction pieces being engaged with an inside of said rotary member on the output side over a substantially constant contact area;
wherein the member to which the friction pieces are rockably connected is formed with spring hooks, a spring being extended about each of two adjacent spring hooks and the springs engage slit-shaped grooves formed in the friction pieces adjacent the rockably connected end thereof, to urge the free ends of said friction pieces in radially outward directions.

4. A stepless speed change device comprising:
an eccentric cam assembly whose eccentricity is adjustable relative to a center shaft;
a carrier rotatably arranged about said eccentric cam assembly;
rotary members on input and output sides of said device, respectively; and
a plurality of friction pieces arranged in two rows, each row including a plurality of friction pieces, said friction pieces being rockably connected to said carrier such that free ends of said friction pieces in one row engage an inside of the rotary member on the input side over a substantially constant contact area and free ends of said friction pieces int he other row engage an inside of the rotary member on the output side over a substantially constant contact area;

wherein each of said friction pieces in said one row is substantially boot-shaped, a toe-shaped portion of said friction pieces in said one row being a trailing portion when said friction pieces in said one row are engaged in a substantially opposite direction as that in which said center shaft rotates, and each of said friction pieces in said other row is substantially boot-shaped, a toe-shaped portion of said friction pieces in said other row being the leading portion when said friction pieces in said other row are engaged in substantially the same direction as that in which said center shaft rotates.

* * * * *